US011094115B2

(12) United States Patent
Ju

(10) Patent No.: US 11,094,115 B2
(45) Date of Patent: Aug. 17, 2021

(54) GENERATING CLOTHING PATTERNS OF GARMENT USING BOUNDING VOLUMES OF BODY PARTS

(71) Applicant: CLO Virtual Fashion Inc., Seoul (KR)

(72) Inventor: Eunjung Ju, Seoul (KR)

(73) Assignee: CLO Virtual Fashion Inc., Seoul (KR)

(*) Notice: Subject to any disclaimer, the term of this patent is extended or adjusted under 35 U.S.C. 154(b) by 0 days.

(21) Appl. No.: 16/999,604

(22) Filed: Aug. 21, 2020

(65) Prior Publication Data

US 2021/0056754 A1 Feb. 25, 2021

(30) Foreign Application Priority Data

Aug. 23, 2019 (KR) ........................ 10-2019-0103928

(51) Int. Cl.
*G06T 19/20* (2011.01)
*G06T 17/10* (2006.01)
*G06T 7/62* (2017.01)
*G06T 7/73* (2017.01)

(52) U.S. Cl.
CPC ................ *G06T 17/10* (2013.01); *G06T 7/62* (2017.01); *G06T 7/75* (2017.01); *G06T 19/20* (2013.01); *G06T 2210/16* (2013.01); *G06T 2219/2004* (2013.01); *G06T 2219/2016* (2013.01)

(58) Field of Classification Search
CPC ... A41H 3/00; A41H 3/04; A41H 5/02; A41H 31/00; G06F 2217/32; G06T 7/62; G06T 7/75; G06T 17/10; G06T 2210/21; G06T 2210/16; G06T 2219/2004; G06T 2219/2016

See application file for complete search history.

(56) References Cited

U.S. PATENT DOCUMENTS

| 2004/0049309 | A1* | 3/2004 | Gardner | .................. G06T 17/00 |
| | | | | 700/132 |
| 2013/0057544 | A1 | 3/2013 | Oh | |
| 2014/0114620 | A1* | 4/2014 | Grinspun | ................ G06T 19/00 |
| | | | | 703/1 |
| 2016/0217618 | A1* | 7/2016 | Adeyoola | ............. G06T 19/006 |
| 2019/0266806 | A1* | 8/2019 | Aluru | ....................... G06T 15/04 |

FOREIGN PATENT DOCUMENTS

KR    10-2011-0119260 A    11/2011

OTHER PUBLICATIONS

Meng, Yuwei, Pik Yin Mok, and Xiaogang Jin. "Computer aided clothing pattern design with 3D editing and pattern alteration." Computer-Aided Design 44.8 (2012): 721-734. (Year: 2012).*

(Continued)

*Primary Examiner* — Diane M Wills
(74) *Attorney, Agent, or Firm* — Fenwick & West LLP

(57) ABSTRACT

A method and a device for displaying clothing patterns determine attributes of bounding volumes for each body part, to which a body type and an orientation of a 3D avatar are reflected, based on locations of feature points extracted from data of the 3D avatar, determine initial locations of the clothing patterns by placing arrangement points on the bounding volumes depending on the attributes of the bounding volumes for each body part, and drape the clothing patterns to the 3D avatar depending on the initial locations.

13 Claims, 9 Drawing Sheets

(56) References Cited

OTHER PUBLICATIONS

CLO Virtual Fashion, "CLO 4.2 Official Release," Sep. 12, 2018, two pages.
CLO Virtual Fashion, "CLO 4.2 Open Beta Test is Updated!," Aug. 23, 2018, three pages.
Griffiths, L., "Marvelous Designer Beginner Tutorial," Apr. 8, 2015, 20 pages, [Online] [Retrieved on Oct. 7, 2019] Retrieved from the Internet <URL: https://www.fearlessmakers.com/marvelous-designer-beginner-tutorial>.
Griffiths, L., "Marvelous Designer Bounding Volumes & Arrangement Points," Aug. 20, 2015, eight pages, [Online] [Retrieved on Oct. 7, 2019] Retrieved from the Internet <URL: https://www.fearlessmakers.com/md-bounding-volumes-arrangement-points/>.

* cited by examiner

GENERATING CLOTHING PATTERNS OF GARMENT USING BOUNDING VOLUMES OF BODY PARTS

CROSS-REFERENCE TO RELATED APPLICATION

This application claims the benefit of Korean Patent Application No. 10-2019-0103928 filed on Aug. 23, 2019, in the Korean Intellectual Property Office, the disclosure of which is incorporated herein by reference.

BACKGROUND

1. Field of the Invention

Example embodiments relate to a method and an apparatus for displaying clothing patterns.

2. Description of the Related Art

When a person wears clothes, the clothes are viewed three-dimensionally. However, in reality, the clothes are formed two-dimensionally because the clothes correspond to the combination of fabric pieces cut depending on a two-dimensional (2D) pattern. Because the fabric that becomes the material of the clothes is flexible, the appearance of the clothes may change depending on the body shape and movement of the person wearing the clothes. For example, wearing clothes may be slid down, wrinkled, or folded due to gravity, wind, or a collision with a body. At this time, the shape in which the clothes are slid down or wrinkled may vary depending on the properties of the fabric. An approach method different from a method of modeling an object made of rigid materials may be required to three-dimensionally simulate clothes made of flexible materials such as a fabric as similar as possible.

SUMMARY

According to an embodiment, to form bounding volumes matched with the size and shape of a three-dimensional (3D) avatar, bounding volumes and arrangement points may be automatically generated by analyzing the shape of the 3D avatar without manually setting the location of the bounding volumes.

According to an embodiment, the processing speed may be improved while the load of the processor is reduced, by simplifying the shape of the 3D avatar into the shape of a 2D shape to extract feature points.

According to an embodiment, arrangement points may be are automatically placed on the bounding volumes to determine the locations of the clothing patterns depending on the attributes of the bounding volumes for each body part, to which the body type and orientation of the 3D avatar are reflected; accordingly, clothing patterns may be placed on body parts quickly and accurately even without the arrangement process by a handwork.

According to an embodiment, a method of displaying clothing patterns includes extracting feature points from data of a three-dimensional (3D) avatar, determining attributes of bounding volumes for each body part, to which a body type and an orientation of the 3D avatar are reflected, based on locations of the feature points, placing arrangement points on the bounding volumes, depending on the attributes of the bounding volumes for each body part, and determining initial locations of clothing patterns, based on the arrangement points.

The determining of the attributes of the bounding volumes for each body part may include forming the bounding volumes for each body part on at least one location of both hands, both feet, both elbows, both knees, both arms, both wrists, left/right torso, both shoulders, a head, a neck, both legs, left/right lower body, and both ankles of the 3D avatar, and determining the attributes of the bounding volumes for each body part, based on the locations of the feature points.

The bounding volumes for each body part may correspond to both hands, both feet, both elbows, both knees, both arms, both wrists, left/right torso, both shoulders, a head, a neck, both legs, left/right lower body, and both ankles of the 3D avatar, respectively.

The bounding volumes for each body part may be composed of a solid column surrounding the body part, and the attributes of the bounding volumes for each body part may include at least one of a cross-sectional shape of the solid column, a length of the solid column, a location of the solid column, and an orientation of the solid column.

The extracting of the feature points may include calling the data of the 3D avatar, generating a two-dimensional (2D) shape of the 3D avatar, based on the data of the 3D avatar, and extracting the feature points from the 2D shape.

The generating of the 2D shape of the 3D avatar may include aligning the 3D avatar in a specific direction, analyzing distribution of points on a two-dimension of the 3D avatar aligned in the specific direction, and generating the 2D shape in the specific direction of the 3D avatar, based on the analyzed result.

The specific direction may include at least one of a front view, a side view, and a top view.

The extracting of the feature points from the 2D shape may include extracting the feature points corresponding to at least one of both arms, both wrists, a left/right torso, both shoulders, a head, a neck, both legs, a left/right lower body, both ankles, armpits, a groin, fingertips of both fingers, between fingers, both backs of hands, both elbows, both knees, both backs of feet, ends of both toes, and both heels of the 3D avatar, from a 2D shape in a front view direction of the 3D avatar, extracting the feature points corresponding to at least one of the head, the neck, hips, a belly, a chest, fingertips of both hands, between fingers of both hands, heels of both feet, and ends of both toes of the 3D avatar, from the 2D shape in a side view direction of the 3D avatar, and extracting the feature points corresponding to a pelvis of the 3D avatar from a point, which most protrudes to both sides, on a plane connecting feature points corresponding to the hip and the belly by rotating the 2D shape in the side view direction to a front view.

The extracting of the feature points from the data of the 3D avatar may include detecting a deformation of the data of the 3D avatar and re-extracting the feature points from the deformed data of the 3D avatar in response to the deformation of the data of the 3D avatar.

The feature points may correspond to at least one of both arms, both wrists, a left/right torso, both shoulders, a head, a neck, both legs, a left/right lower body, both ankles, armpits, a groin, a pelvis, hips, a belly, a chest, both hands, both feet, both elbows, both knees, both fingertips, between fingers, both backs of hands, both backs of feet, both ends of toes, and both heels of the 3D avatar.

The 3D avatar may include at least one of a 3D avatar created based on a predetermined body size, a 3D avatar created based on a size obtained by changing the predetermined body size, a 3D avatar created by a user, a 3D avatar created based on data obtained by three-dimensionally scanning a body of the user, and a 3D avatar created based on pieces of 2D image data obtained by capturing a plurality of images at various angles.

According to an embodiment, a method of displaying clothing patterns includes determining attributes of bounding volumes for each body part, to which a body type and an orientation of a 3D avatar are reflected, based on locations of feature points extracted from data of the 3D avatar, determining initial locations of the clothing patterns by placing arrangement points on the bounding volumes depending on the attributes of the bounding volumes for each body part, and draping the clothing patterns to the 3D avatar depending on the initial locations.

The determining of the attributes of the bounding volumes for each body part may include extracting the feature points from the data of the 3D avatar, forming the bounding volumes for each body part on at least one location of both hands, both feet, both elbows, both knees, both arms, both wrists, left/right torso, both shoulders, a head, a neck, both legs, left/right lower body, and both ankles of the 3D avatar, and determining the attributes of the bounding volumes for each body part, based on the locations of the feature points.

The extracting of the feature points may include calling the data of the 3D avatar, generating a two-dimensional (2D) shape of the 3D avatar, based on the data of the 3D avatar, and extracting the feature points from the 2D shape.

The generating of the 2D shape of the 3D avatar may include aligning the 3D avatar in a specific direction, analyzing distribution of points on a two-dimension of the 3D avatar aligned in the specific direction, and generating the 2D shape in the specific direction of the 3D avatar, based on the analyzed result.

The extracting of the feature points from the data of the 3D avatar may include detecting a deformation of the data of the 3D avatar and re-extracting the feature points from the deformed data of the 3D avatar in response to the deformation of the data of the 3D avatar.

The bounding volumes for each body part may be composed of a solid column surrounding the body part, and the attributes of the bounding volumes for each body part may include at least one of a cross-sectional shape of the solid column, a length of the solid column, a location of the solid column, and an orientation of the solid column.

The clothing patterns may include information corresponding to the bounding volumes and the arrangement points.

According to an embodiment, an apparatus for displaying clothing patterns includes a user interface to receive locations of feature points extracted from data of a 3D avatar and a processor to determine attributes of bounding volumes for each body part, to which a body type and an orientation of the 3D avatar are reflected, based on locations of the feature points, to determine initial locations of the clothing patterns by placing arrangement points on the bounding volumes depending on the attributes of the bounding volumes for each body part, and to drape the clothing patterns to the 3D avatar depending on the initial locations.

The apparatus for displaying clothing patterns may further include an output device to output the clothing patterns draped to the 3D avatar.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
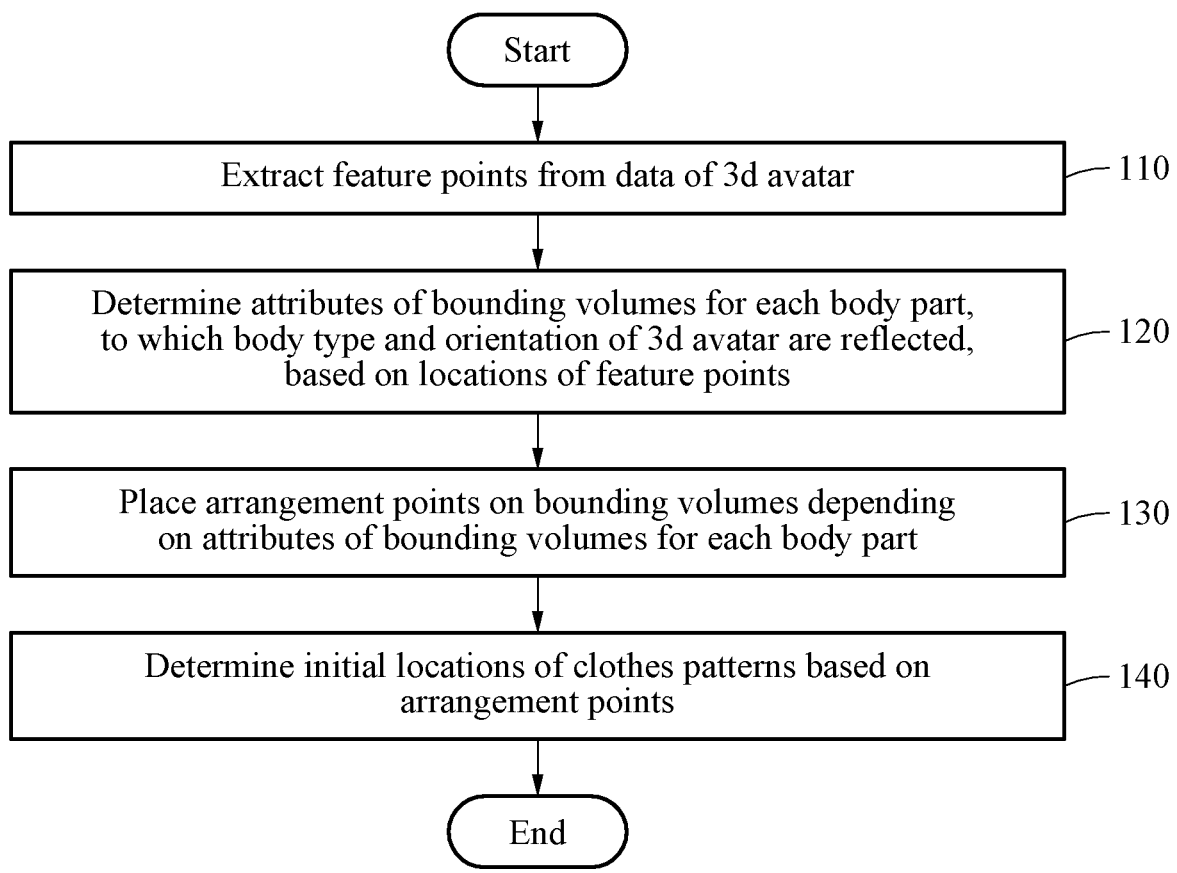
FIG. 1 is a flowchart illustrating a method of displaying clothing patterns, according to an embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

The terminology used in the embodiment is for the purpose of description and should not be construed as limiting. The articles "a," "an," and "the" are singular in that they have a single referent, however, the use of the singular form in the present document should not preclude the presence of more than one referent. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which the embodiment belongs. It will be understood that terms used herein should be interpreted as having a meaning that is consistent with their meaning in the context of the present invention and the relevant art and will not be interpreted in an idealized or overly formal sense unless expressly so defined herein.

Furthermore, in the following description with reference to the accompanying drawings, the same reference numerals are assigned to the same components regardless of the reference numerals, and redundant descriptions thereof will be omitted. In the following description of the embodiment, when it is determined that the detailed description of the related well-known technology may obscure the gist of the embodiment unnecessarily, the detailed description thereof will be omitted.

FIG. 1 is a flowchart illustrating a method of displaying clothing patterns, according to an embodiment. Referring to FIG. 1, according to an embodiment, in operation 110, an apparatus for displaying clothing patterns (hereinafter, 'display apparatus') extracts feature points from data of a 3D avatar. An example of the 3D avatar may refer to 315 of FIG. 3 below. For example, the data of the 3D avatar may include the body size of the 3D avatar, the location coordinates of each body part, and the like. The 'feature points' refer to points on the 3D avatar that correspond to predetermined locations of body parts that are subject to measurements for designing or fabricating clothing. For example, the feature points may correspond to at least one of the both arms, both wrists, left/right torso, both shoulders, head, neck, both legs, left/right lower body, both ankles, armpits, groin, pelvis, hips, belly, chest, both hands, both feet, both elbows, both knees, both fingertips, between fingers, both backs of hands, both backs of feet, ends of toes, and both heels of the 3D avatar. The term 'draping' as used herein is a process of covering or arranging a 3D clothes object on the 3D avatar by combining pattern information or clothing patterns through a computer program.

In operation 120, the display apparatus determines the attributes of the bounding volumes for each body part, to which the body type and orientation of the 3D avatar are reflected, based on the locations of the feature points. The body type of the 3D avatar may be classified into features that appear on the physique depending on a height and/or weight; for example, the body type of the 3D avatar may include a thin body type, a standard body type, an upper body obesity type, a lower body obesity type, an upper/lower body obesity type, a dry obese body type, or the like. For example, the body type of the 3D avatar may be determined based on the body size of the subject, which will wear clothes produced using the clothing patterns, or the body size of the average person for each race, age, and/or gender.

Figure 4:
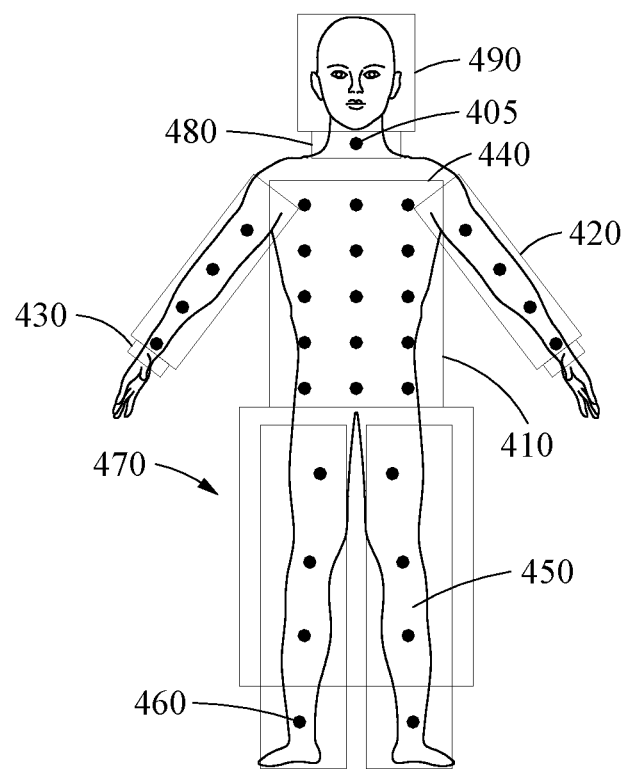
FIG. 4 is a diagram illustrating bounding volumes for each body part, according to an embodiment.

For example, as illustrated in the screen of FIG. 4 below, the bounding volumes for each body part may correspond to the both hands, both feet, both elbows, both knees, both arms, both wrists, left/right torso, both shoulders, head (face), neck, both legs, left/right lower body, and both ankles of the 3D avatar. According to an embodiment, the bounding volumes for both arms and both legs may be divided based on both elbows and both knees.

For example, the bounding volumes for each body part may be implemented in the form of a solid column surrounding the corresponding body part. For example, the solid column may include a cylinder, an ellipse column, a polygonal column, or the like. The bounding volumes for each body part may be implemented in various forms in addition to the solid column, but are not necessarily limited thereto.

For example, the attributes of bounding volumes for each body part may include the cross-sectional shape of the solid column, the length of the solid column, the location and orientation of the solid column. The cross-sectional shape of the solid column may be set differently depending on the type of a cross section (e.g., an ellipse, a circle, a polygon, or the like) as the attribute of the width of the solid column. For example, when the type of cross section is an ellipse, the cross-sectional shape may include the long radius of the ellipse and the short radius of the ellipse. In addition, the location of the solid column may correspond to information expressed as, for example, x, y, and z coordinates. For example, the orientation of the solid column may correspond to information expressed as the three-axis rotation angle of a pitch, a yaw, and a roll.

In operation 120, for example, the display apparatus may form the bounding volumes for each body part on at least one location of the both hands, both feet, both elbows, both knees, both arms, both wrists, left/right torso, both shoulders, head, neck, both legs, left/right lower body, and both ankles of the 3D avatar. The display apparatus may determine the attributes of the bounding volumes for each body part based on the locations of the feature points. A method in which the display apparatus extracts the feature points and determines the attributes of bounding volumes for each body part based on the locations of the feature points will be described in detail with reference to FIG. 2 below.

In operation 130, the display apparatus places arrangement points on the bounding volumes depending on the attributes of the bounding volumes for each body part. The display apparatus may generate and place the arrangement points on the bounding volumes depending on the attributes of the bounding volumes for each body part. The 'arrangement points' refer to candidate locations on a 3D avatar for initially placing 2D clothing patterns. For each bounding volume, a grid may be used to place the bounding volume. The number and/or sparsity of grid points may differ depending on bounding volumes associated with the grid. For example, a grid for the bound volume of a torso may be denser than that for the bound volume of an arm. In one or more embodiments, the arrangement points may be manually edited.

In operation 140, the display apparatus determines the initial locations of the clothing patterns based on the arrangement points. In general, the 'clothing patterns' may correspond to the paper pattern shape for cutting the material when clothes are produced; in the specification, 'clothing patterns' may correspond to the patterns of 2D planes virtually produced by a computer program. For example, the clothing patterns may be clothing patterns used to produce clothes that the user desires to drape on the 3D avatar. An example of clothing patterns according to an embodiment may refer to the screen 330 of FIG. 3 below. An 'initial location' described herein refer to a location where a 2D clothing pattern is initially placed. In one embodiment, the initial placement of the clothing pattern is accomplished by placing the center of mass of the clothing pattern on the initial location. The initial location may be set manually according to a user input. Alternatively, an arrangement point may be set as a default initial location for placing the clothing pattern. Further, the initial point may be selected from the arrangement point automatically using a set of rules. If the initial point is appropriately selected so that the clothing pattern wraps around a body part (e.g., arm), the efficiency and/or accuracy of subsequent sewing simulation or draping simulation can be enhanced.

The clothing patterns according to an embodiment may be virtual 2D clothing patterns modeled through the sum of numerous triangle meshes for the simulation of 3D virtual clothes. The three vertices of the mesh may be point masses; each side of the mesh may be expressed as springs having elasticity connecting the point masses. As such, for example, the clothing patterns may be modeled by a mass-spring model. Herein, the springs may have each resistance for stretch, shear, and bending depending on the properties of the used fabric. Each vertex may move under the actions of the external force such as gravity and the internal force of stretch, shear, and bending. When the force applied to each vertex is obtained by calculating the external and internal forces, the displacement and the moving speed of each vertex may be obtained. Moreover, the motion of the virtual clothes may be simulated through the motions of the vertices of the mesh at each time step. When 2D virtual clothing patterns made of triangle meshes are draped to the 3D avatar, natural 3D virtual clothes based on the laws of physics may be realized. The method in which the display apparatus determines the initial locations of clothing patterns will be described in detail with reference to FIG. 5 below.

According to an exemplary embodiment, the display apparatus may display the result processed in each of the above-described operations 110 to 140 to the user through a screen such as a display.

Figure 2:
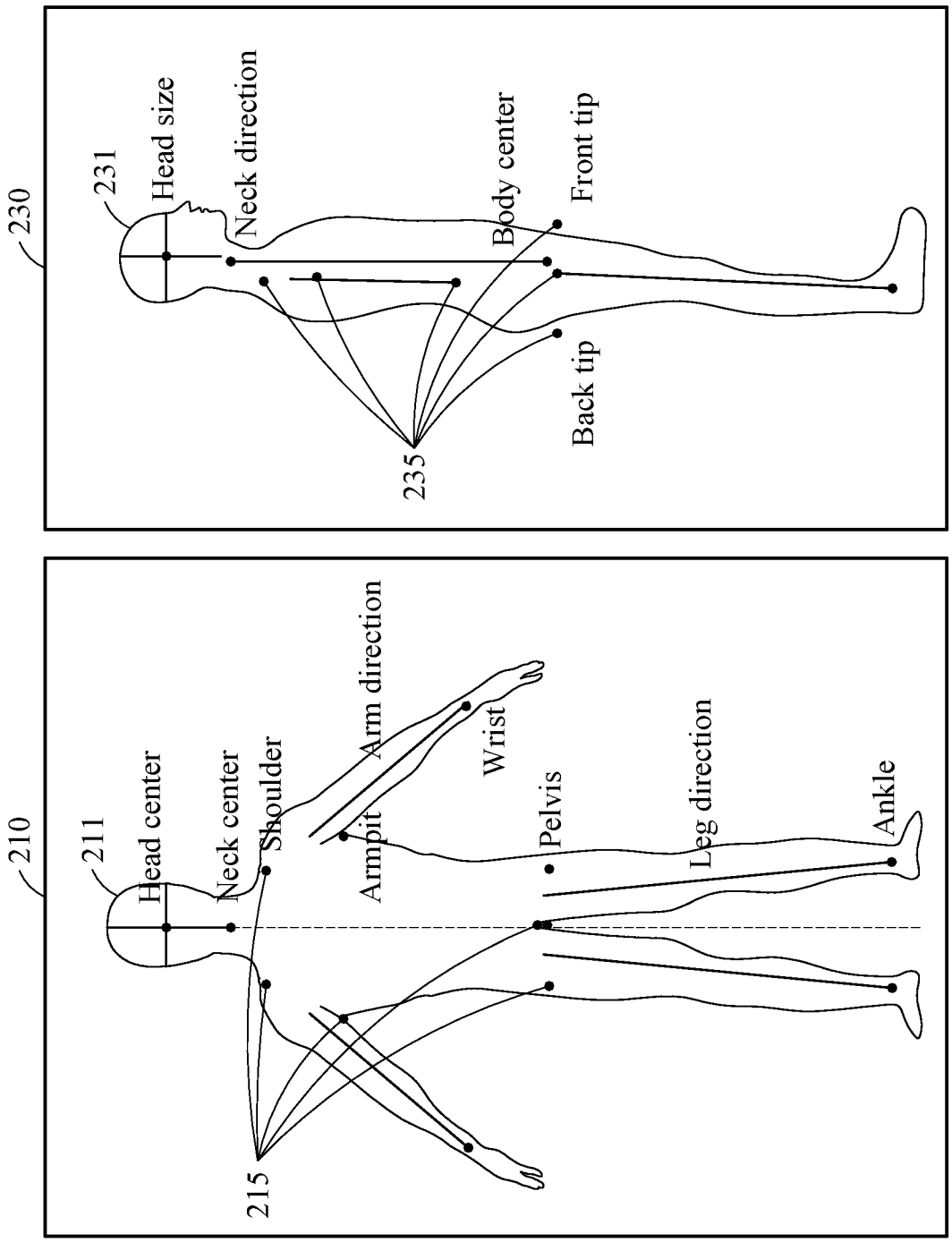
FIG. 2 is a diagram for describing a method of determining attributes of bounding volumes for each body part based on locations of feature points, according to an embodiment.

FIG. 2 is a diagram for describing a method of determining attributes of bounding volumes for each body part based on locations of feature points, according to an embodiment. Referring to FIG. 2, the 2D shapes 211 and 231 and feature points 215 and 235 of a 3D avatar are illustrated in diagrams 210 and 230.

The display apparatus according to an embodiment may generate the 2D shapes 211 and 231 of the 3D avatar, as illustrated in the diagrams 210 and 230, based on the data of the 3D avatar.

The display apparatus may align the 3D avatar in a specific direction. For example, the specific direction may be at least one of a front view, a side view, and a top view and/or the combination thereof. For example, the display apparatus may analyze the distribution of 2D points of the 3D avatar, which are aligned in specific directions such as the front direction and the side direction and may generate the 2D shape in a specific direction of the 3D avatar, based on the analysis result.

For example, the display apparatus may generate a 2D shape corresponding to the specific direction of the 3D avatar by projecting the 3D avatar onto a 2D plane at a predetermined resolution (hereinafter, referred to as a 'projection resolution'). The 2D shape may include a plurality of points distributed at the projection resolution, and the 2D shape may be expressed through the plurality of points. According to an embodiment, the projection resolution may be lower than a resolution corresponding to points on the mesh grid of the 3D avatar, thereby simplifying the process for extracting feature points.

For example, the display apparatus may generate the 2D shape 211 in the front direction as shown in the diagram 210 and may generate the 2D shape 231 in the side direction as shown in the diagram 230.

The display apparatus may extract feature points 215 and 235 from the 2D shapes 211 and 231 illustrated in the diagram 210 and the diagram 230 by using, for example, a rule-based algorithm. The locations of feature points 215 and 235 may be the basis for determining the attributes of bounding volumes for each body part to which the body type and orientation of the 3D avatar are reflected.

For example, the display apparatus may extract the feature points 215 corresponding to at least one of the both arms, both wrists, left/right torso, both shoulders, head, neck, both legs, left/right lower body, both ankles, armpits, groin, fingertips of both hands, between (or valley) fingers of both hands, both backs of hands, both elbows, both knees, both backs of feet, ends of toes, and both heels of the 3D avatar.

For example, the display apparatus may extract feature points corresponding to the armpit from the point of the bend between the arm and torso of the 3D avatar. The display apparatus may extract feature points corresponding to the shoulder by determining a point spaced away from the armpit location of the 3D avatar by a specific distance in a direction of the head. For example, the display apparatus may extract the feature points corresponding to the wrist from the point of the wrist having a thin thickness, which is straightly connected from the middle point of the armpit and shoulder of the 3D avatar. For example, the display apparatus may extract feature points corresponding to the groin from the point of the bend between one leg and the other leg of the 3D avatar. For example, the display apparatus may extract the feature points corresponding to the ankle from the point of the ankle having a thin thickness, which is straightly connected from a point spaced from the groin of the 3D avatar.

For example, the display apparatus may extract feature points corresponding to both elbows from a point positioned at a specific ratio in the length of both arms. Furthermore, for example, the display apparatus may extract feature points corresponding to both knees from a point corresponding to a specific ratio in the length of both knees.

For example, the display apparatus may extract the feature points 235 corresponding to at least one of the head, neck, hips, belly, chest, fingertips of both hands, between (or valley) fingers of both hands, heels of both feet, and ends of toes of the 3D avatar.

Alternatively, for example, the display apparatus may extract the feature points corresponding to the pelvis of the 3D avatar from the point (which protrudes further from both sides) on the plane connecting the feature points corresponding to the hip and belly by rotating the 2D shape 231 in the side view direction to the front. In an embodiment, the feature points are extracted by simplifying the shape of the 3D avatar to 2D, and thus the feature points may be extracted quickly and efficiently using fewer pieces of data.

For example, when the 3D avatar, from which feature points are to be extracted, is an avatar created by a user, the 3D avatar may not have the shape of the head, hands, or feet like a mannequin, depending on the user's preference. When the 3D avatar has no hands, for example, the display apparatus may analyze the mesh distribution of the periphery of a point spaced from the feature point positioned at the armpit of the 3D avatar and then may determine whether the point is a wrist or a hand.

Alternatively, when the 3D avatar, from which feature points are to be extracted, is a 3D avatar created based on 3D scan data of a human body, it may appear that the mesh of a part of the body is empty upon obtaining the 2D shape. In this case, the display apparatus may extract feature points by detecting an approximate shape of a body from the 3D scan data of the human body.

According to an embodiment, the display apparatus may extract feature points from the 3D avatar data without 2D projection, by using deep learning. For example, the display apparatus may render the 3D avatar at various angles to obtain one or more images and then may extract feature points from one or more images through a deep learning model. Alternatively, the display apparatus may extract feature points at once from data corresponding to the 3D avatar through a deep learning model.

The display apparatus may determine the attributes of the bounding volumes for each body part, to which the body type and orientation of the 3D avatar are reflected, based on the locations of the feature points. A method in which the display apparatus according to an embodiment determines the attributes of the bounding volumes for each body part based on the locations of the extracted feature points is as follows. Hereinafter, for convenience of explanation, it is assumed that the cross-section type of the solid column is circular. In this case, the cross-sectional shape of the solid column may include a radius.

The display apparatus may determine that the orientation of the solid column among the attributes of the bounding volumes of both arms is the arm direction, based on the locations of feature points on both arms. At this time, for example, the 'arm direction' may correspond to the direction in which the wrist is connected to the center point of the armpit and the shoulder. The display apparatus may determine that the location of the solid column among the attributes of the bounding volumes of both arms is the center point of the armpit or shoulder and the center of the wrist. For example, the display apparatus may determine that the radius of the solid column among the attributes of the bounding volumes of both arms is the greatest value among the distance from the arm direction vector to the armpit location and the distance from the arm direction vector to the shoulder. Also, the display apparatus may determine the length of the solid column among the attributes of the bounding volumes of both arms, at a specific ratio of the length of the arm direction.

The display apparatus may determine that the orientation of the solid column among the attributes of the bounding volumes of both wrists is the arm direction and may determine that the location of the solid column is the wrist, based on the locations of feature points of both wrists. For example, the display apparatus may determine the radius and length of the solid column among the attributes of the bounding volumes of both wrists, at a specific ratio of the arm bounding volumes.

The display apparatus may determine the orientation of the solid column in the y-axis direction (vertical direction) among the attributes of the bounding volumes of the left/right torso, based on the locations of the feature points of the left/right torso, may determine the x-axis location of the solid column about the right pelvis, may determine the y-axis location of the solid column about the shoulder or the pelvis, and may determine the z-axis location about the front surface and back surface of the body. Herein, the x-axis may correspond to the left and right directions of the avatar; the y-axis may correspond to the up and down directions of the avatar; and the z-axis may correspond to the forward and backward directions of the avatar. The display apparatus may determine the radius of the solid column among the attributes of the bounding volumes of the left/right torso, based on the length of the left/right pelvis and the front surface or rear surface of the body. Moreover, the display apparatus may determine the length of the bounding volumes of the left/right torso, for example, the distance from the center of the shoulder to the center of the pelvis.

The display apparatus may determine the orientation of the solid column among the attributes of the bounding volumes of both shoulders in the z direction, based on the locations of the feature points of both shoulders and may determine the location of the solid column based on the location of the feature point of the shoulder. The display apparatus may determine the radius of the solid column among the attributes of the bounding volumes of both shoulders, based on the width between the left and right feature points on the left/right shoulders and may determine the length of the bounding volumes of both shoulders to a fixed value, for example, 15.5 cm.

The display apparatus may determine the orientation of the solid column among the attributes of the bounding volumes of the head in the y-axis direction of the feature point of the left or right head, based on the locations of the feature points in the three directions (e.g., left, right, and vertical directions, or x, y, and z axis directions) of the head and in the z-axis direction of the feature point in the vertical direction of the head. The display apparatus may determine the location of the solid column among the attributes of the bounding volumes of the head as the location of the feature point of the head center. For example, the display apparatus may determine the radius of the solid column among the attributes of the bounding volumes of the head as the value of a head size in the x and z axis directions and may determine the length of the bounding volumes as the value of the head size in the y-axis direction.

The display apparatus may determine the orientation of the solid column among the attributes of bounding volumes of the neck, based on the locations of the feature points of the neck. In the display apparatus, the location of the solid column among the attributes of bounding volumes of the neck may be determined as the neck center or neck direction. For example, the 'neck direction' may be determined by the feature points of the neck. For example, the display apparatus may determine the radius of the solid column among the attributes of the bounding volumes of the neck at a specific ratio of the head size and may determine the length of the bounding volumes at the length in a neck direction.

The display apparatus may determine the attributes of the bounding volumes of both legs surrounding both legs, based on the locations of the feature points of both legs. The display apparatus may determine the orientation of the solid column among the attributes of the bounding volumes of both legs, based on the location of feature points in the leg direction. At this time, for example, the 'leg direction' may be a direction in which a vertex based on the locations of feature points of the front torso, rear torso, and pelvis is connected to the ankle. The display apparatus may determine the location of the solid column among the attributes of the bounding volumes of both legs as the center in the leg direction. The display apparatus may determine the radius of the solid column among the attributes of the bounding volumes of both legs at a specific ratio of the distance between feature points of the front torso, rear torso, and pelvis. For example, the display apparatus may determine the length of the bounding volumes of both legs as the length in the leg direction. The bounding volumes of both legs may be the bounding volumes for pants.

The display apparatus may determine the attributes of the bounding volumes of the left/right lower body surrounding the whole lower body, based on the locations of the feature points of the left/right lower body. The display apparatus may determine the orientation of the solid column among the attributes of the bounding volumes of the left/right lower body in the leg direction. The display apparatus may determine the locations of the solid column among the attributes of the bounding volumes of the left/right lower body, based on the locations of feature points of the front torso, rear torso, and pelvis. The display apparatus may determine the radius of the solid column among the attributes of the bounding volumes of the left/right lower body at a specific ratio of the distance between feature points of the front torso, rear torso, and pelvis. For example, the display apparatus may determine the length of the bounding volumes of both legs at a specific ratio of the length in the leg direction, depending on the length of a skirt to be produced. The bounding volumes of the left/right lower body may be bounding volumes for the skirt.

The display apparatus may determine the location of the solid column among the attributes of the bounding volumes of both ankles in the leg direction. The display apparatus may determine the location of the solid column among the attributes of the bounding volumes of both ankles as the location of each of the feature points of the ankle and may determine the radius of the bounding volumes of both ankles at the specific ratio of bounding volumes of both legs. Furthermore, the display apparatus may determine the length of the bounding volumes of both ankles at a specific ratio of bounding volumes of both legs.

Although not illustrated, for example, the display apparatus may generate a 2D shape in the top view direction.

For example, the display apparatus may extract feature points corresponding to at least one of fingertips of both hands, between (or valley) fingers of both hands, the backs of both hands, both shoulders, a head, both elbows, both toe tips, and both heels, from the 2D shape in the top view direction.

The details described as feature points extractable depending on the front, side, and top view directions are exemplary; the feature points capable of being extracted from each of the front, side, and top view directions may vary depending on the pose of an avatar.

Figure 3:
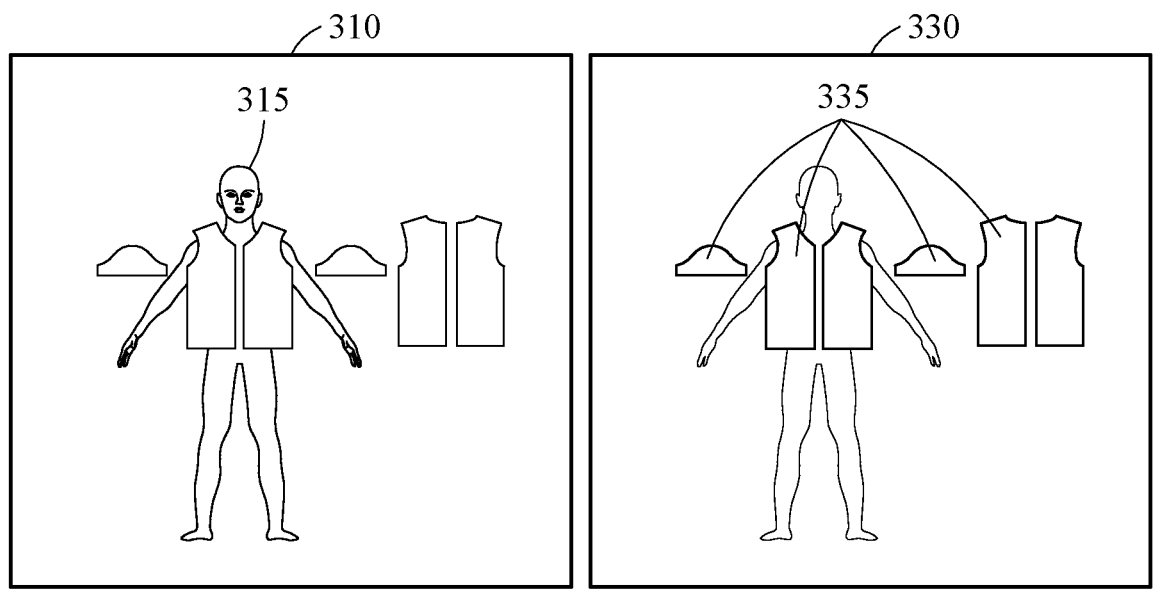
FIG. 3 is a screen illustrating clothing patterns corresponding to a 3D avatar and each body part of the 3D avatar, according to an embodiment.

FIG. 3 is a screen illustrating clothing patterns corresponding to a 3D avatar and each body part of the 3D avatar, according to an embodiment. Referring to FIG. 3, according to one embodiment, screen 310 displaying a 3D avatar 315 and screen 330 displaying clothing patterns 335 are illustrated.

According to an embodiment, for example, the 3D avatar 315 may be created based on a predetermined body size, may also be created based on a size obtained by changing the predetermined body size, may be created by a user, or may be created based on data obtained by three-dimensionally scanning the user's body. In addition, for example, the 3D avatar 315 may be created or reconstructed based on pieces of 2D image data obtained by capturing a plurality of images at different angles.

The clothing patterns 335 according to an embodiment may correspond to virtual clothes that the user desires to drape on the 3D avatar 315. For example, when the user selects "t-shirt" as the virtual clothes for draping the 3D avatar 315, the display apparatus may provide the clothing patterns 335 corresponding to the t-shirt as illustrated in screen 330.

The clothing patterns 335 may correspond to each body part of the 3D avatar 315. When the size or body type of the 3D avatar is changed, the clothing patterns 335 may be placed on the body part of the 3D avatar 315 by the arrangement points automatically placed by the attributes of bounding volumes for each body part of the 3D avatar 315 depending on the changed size or body type, without a separate process of setting arrangement points.

FIG. 4 is a diagram illustrating bounding volumes for each body part, according to an embodiment. Referring to FIG. 4, according to an embodiment, bounding volumes 410, 420, 430, 440, 450, 460, 470, 480, and 490 for each body part are illustrated.

For example, the bounding volumes according to an embodiment may include bounding volumes 410 of torso, bounding volumes 420 of an arm, bounding volumes 430 of a wrist, bounding volumes 440 of a shoulder, bounding volumes 450 of a leg, bounding volumes 460 of an ankle, bounding volumes 470 of a lower body, bounding volumes 480 of a neck, and bounding volumes 490 of a head.

For example, the bounding volumes 410 of the torso may be composed of two bounding volumes of the left and right torsos or the front and rear torsos.

For example, the bounding volumes 420 of an arm may be composed of bounding volumes of both left and right arms; for example, the bounding volumes 430 of the wrist may be composed of the bounding volumes of both left and right wrists.

For example, the bounding volumes 440 of the shoulder may be composed of bounding volumes of both left and right shoulders.

For example, the bounding volumes 450 of the leg may be composed of bounding volumes of both left and right legs; for example, the bounding volumes 460 of the ankle may be composed of bounding volumes of left and right ankles.

For example, the bounding volumes 470 of the lower body may be composed of bounding volumes of both left and right lower bodies.

For example, the bounding volumes 480 of the neck may be composed of bounding volumes of both left and right necks.

For example, the bounding volumes 490 of the head may be composed of the bounding volumes of the head in three directions of left, right, and vertical directions or x (horizontal), y (vertical), z (depth).

According to an embodiment, for example, arrangement points 405 in the form of a point or a star may be placed in the bounding volumes for each body part 410, 420, 430, 440, 450, 460, 470, 480, or 490 depending on the attributes of bounding volumes for each body part. According to an embodiment, the arrangement points 405 may have the form of triangles, squares, and other polygons in addition to the points or stars but may not be limited thereto.

Figure 5:
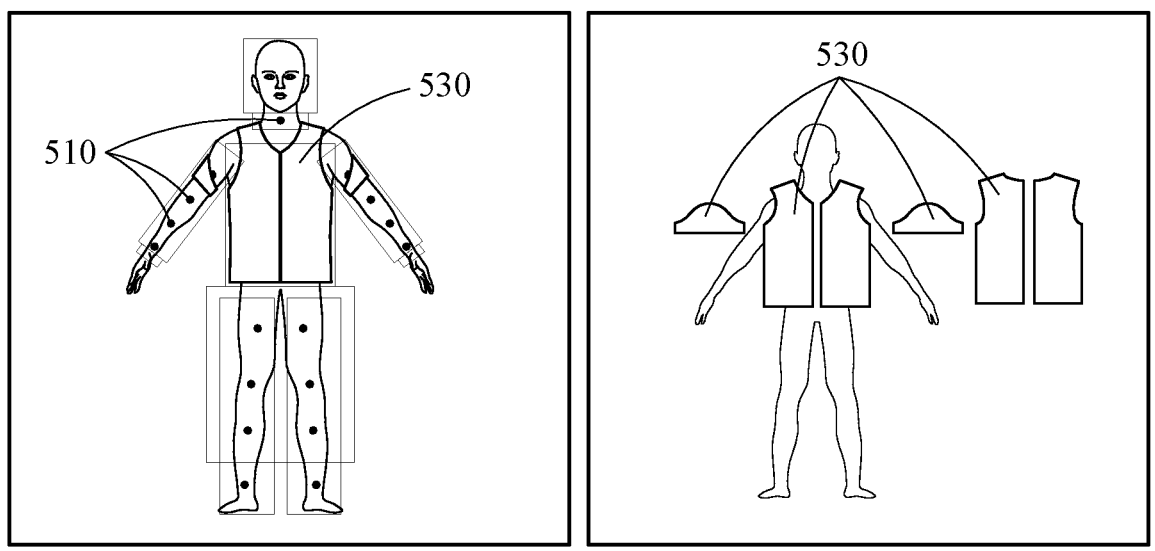
FIG. 5 is a diagram for describing a method of determining initial locations of clothing patterns based on arrangement points, according to an embodiment.

FIG. 5 is a diagram for describing a method of determining initial locations of clothing patterns based on arrangement points, according to an embodiment. Referring to FIG. 5, according to one embodiment, a screen in which clothing patterns 530 are arranged in bounding volumes is shown.

According to an embodiment, the clothing patterns 530 may include information corresponding to the bounding volumes and arrangement points 510. For example, the clothing patterns 530 may include information about which arrangement point of bounding volumes of a body part of a 3D avatar needs to be placed. The display apparatus may grasp the arrangement points 510 on the bounding volumes, on which the clothing patterns 530 need to be placed, based on the information included in the clothing patterns 530 and may determine the initial locations of the clothing patterns 530. The display apparatus may place the clothing patterns 530 on the 3D avatar depending on the determined initial locations.

According to an embodiment, the arrangement points 510 may be automatically placed on the bounding volumes depending on the attributes of the bounding volumes for each body part. The bound volumes reflect the body type and orientation of the 3D avatar, and thus, the initial locations of clothing patterns 530 may be determined. An arrangement point may be set with respect to the dimensions of a corresponding bounding volume. For example, the arrangement point may be located at a middle point between two ends of a corresponding bounding volume. As such, even though a user selects the clothing patterns 530 to be draped to the 3D avatar and then does not manually select and place arrangement points close to the location at the clothing patterns 530 are draped, the pattern may be automatically draped to the appropriate location of the 3D avatar. As such, even when the size of the 3D avatar is changed or even when the 3D avatar having no specified size is used, the work efficiency may be increased because there is no need to change the settings of bounding volumes and arrangement points manually.

Figure 6:
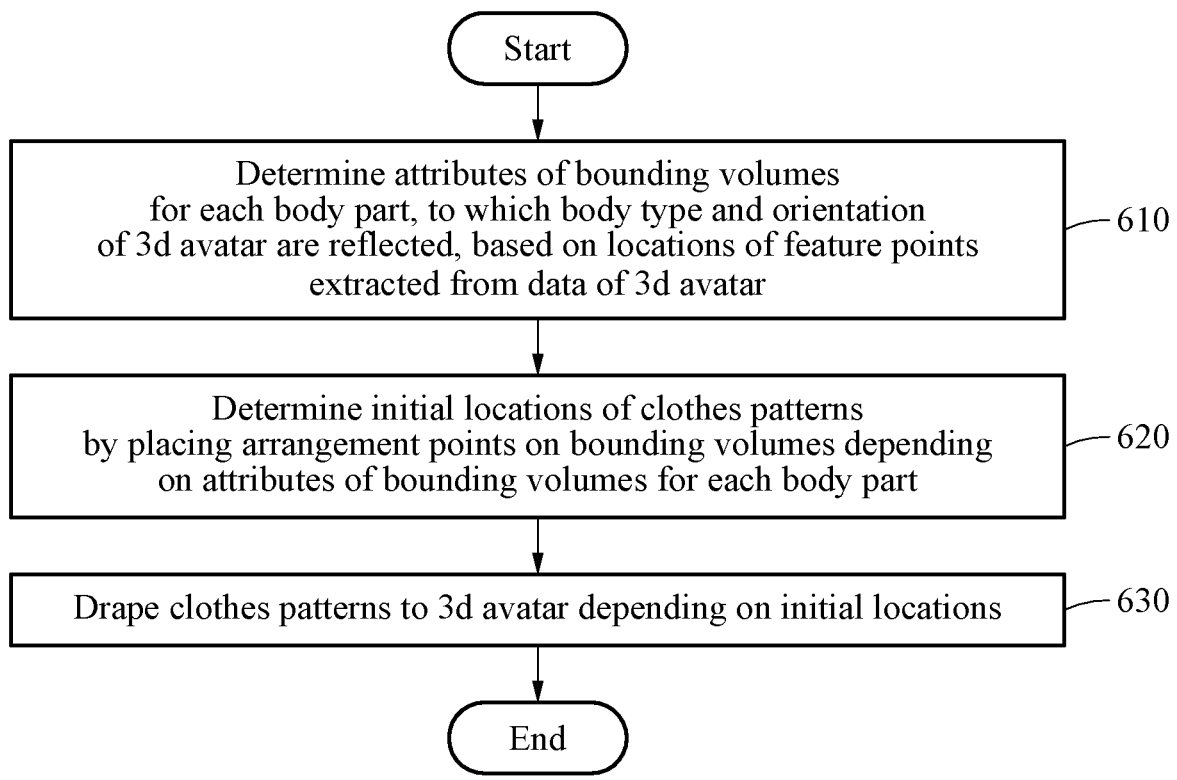
FIG. 6 is a flowchart illustrating a method of displaying clothing patterns, according to an embodiment.

FIG. 6 is a flowchart illustrating a method of displaying clothing patterns, according to an embodiment. Referring to FIG. 6, according to an embodiment, in operation 610, a display apparatus determines the attributes of the bounding volumes for each body part, to which the body type and orientation of a 3D avatar are reflected, based on the locations of the feature points extracted from the data of the 3D avatar. For example, the display apparatus may extract feature points from the data of the 3D avatar. For example, the display apparatus may form the bounding volumes for each body part on at least one location of the both hands, both feet, both elbows, both knees, both arms, both wrists, left/right torso, both shoulders, head, neck, both legs, left/right lower body, and both ankles of the 3D avatar. The display apparatus may determine the attributes of the bounding volumes for each body part based on the locations of the feature points. A method in which the display apparatus extracts the feature points and a method in which the display apparatus determines the attributes of bounding volumes for each body part based on the locations of the feature points are the same as the descriptions of FIG. 2 described above, and thus will refer to the description of the corresponding part.

In operation 620, the display apparatus determines the initial locations of the clothing patterns by placing arrangement points on the bounding volumes depending on the attributes of the bounding volumes for each body part.

In operation 630, the display apparatus drapes the clothing patterns to the 3D avatar depending on the initial locations. The apparatus may calculate acceleration applied to the plurality of polygons in their initial locations in the first iteration by simultaneously considering the force and Jacobian applied to the polygons of the clothing patterns. For example, after defining a system of equations corresponding to a plurality of polygons as a linear system, the simulation apparatus may solve the corresponding linear system to calculate accelerations of a plurality of polygons of the clothing patterns. Then, the simulation apparatus may calculate velocities and positions of the polygons from the accelerations of the polygons derived from the force and Jacobian applied to the polygons of the clothes. The force applied to the polygons include internal force caused by sewing or the physical properties of the clothes (e.g., contracting or to unfolding force) and external force such as gravity. Additional force may be added as external force to prevent a collision between the polygons of the clothing patterns or between the polygons of the clothing patterns and the polygons of the 3D avatar model.

Although the linear system calculation is performed in a manner so that the collisions between polygons of the clothing patterns or collisions between the polygons of the clothing patterns and polygons of the 3D avatar model are reduced, collisions may nevertheless occur. Such collisions are handled separately, and the positions and velocities of polygons without collisions can be provided to the next iteration.

The final locations of the polygons of the clothes on the avatar are obtained by repeating the above-described iteration until predefined conditions are met.

According to an embodiment, the display apparatus may display only the final screen, in which clothing patterns are draped to the 3D avatar depending on the initial locations determined through the above-described process, to the user or may sequentially display an operation screen of each process for displaying clothing patterns to the user, as described above with reference to FIG. 1. The method in which the display apparatus drapes clothing patterns to the 3D avatar will be described in detail with reference to FIG. 7 below.

Figure 7:
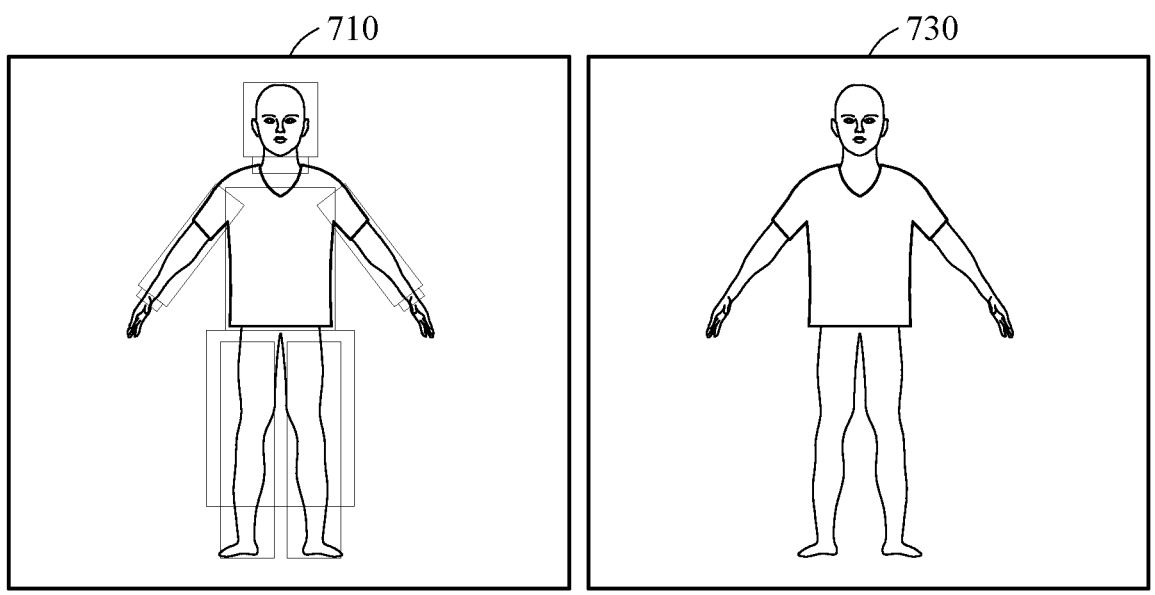
FIG. 7 is a diagram for describing a method of draping clothing patterns to a 3D avatar depending on initial locations, according to an embodiment.

FIG. 7 is a diagram for describing a method of draping clothing patterns to a 3D avatar depending on initial locations, according to an embodiment. Referring to FIG. 7, screen 710 in which clothing patterns are located on a 3D avatar and screen 730 in which the virtual clothes according to the clothing patterns are draped to the 3D avatar are illustrated.

For example, as illustrated in screen 710, when the clothing patterns are located on the 3D avatar by bounding volumes for each body part, a display apparatus may remove the bounding volumes for each body part and may simulate the result of draping a t-shirt, which is virtual clothes made by sewing clothing patterns, to the 3D avatar, as illustrated in screen 730 to display the simulated result to the user.

Figure 8:
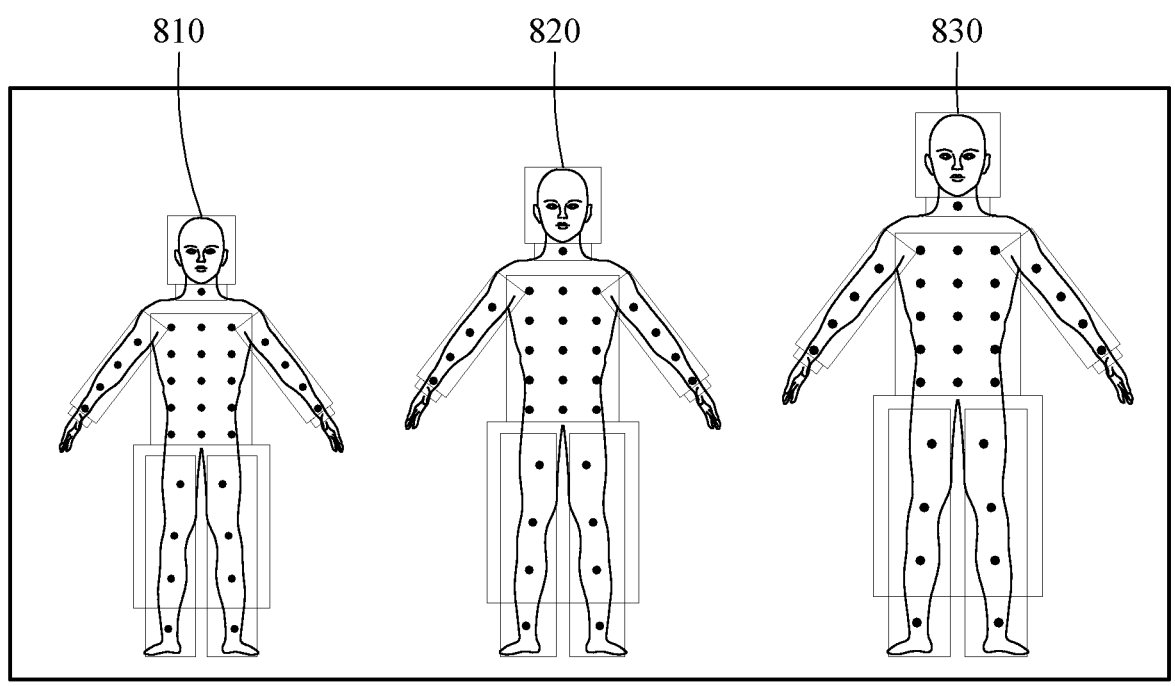
FIG. 8 is a diagram illustrating bounding volumes generated in compliance with 3D avatars of different body types, according to an embodiment.

FIG. 8 illustrates bounding volumes generated in compliance with 3D avatars of different body types, according to an embodiment. Referring to FIG. 8, bounding volumes for each body part of 3D avatars 810, 830 and 850 of different body types are illustrated.

For example, it is assumed that the user differently sets attributes such as the height, weight, or the like of the 3D avatar and thus the data of the 3D avatar is modified. In this case, a display apparatus may detect the deformation of the data of the 3D avatar and may re-extract feature points from the deformed data of the 3D avatar in response to the deformation of the data of the 3D avatar. The display apparatus may determine the attributes of the bounding volumes for each body part, to which the body type and orientation of the 3D avatars 810, 830, and 850 of different body types are reflected, based on the locations of the re-extracted feature points. The display apparatus may display bounding volumes in which arrangement points are placed depending on the attributes of bounding volumes for each body part.

Figure 9:
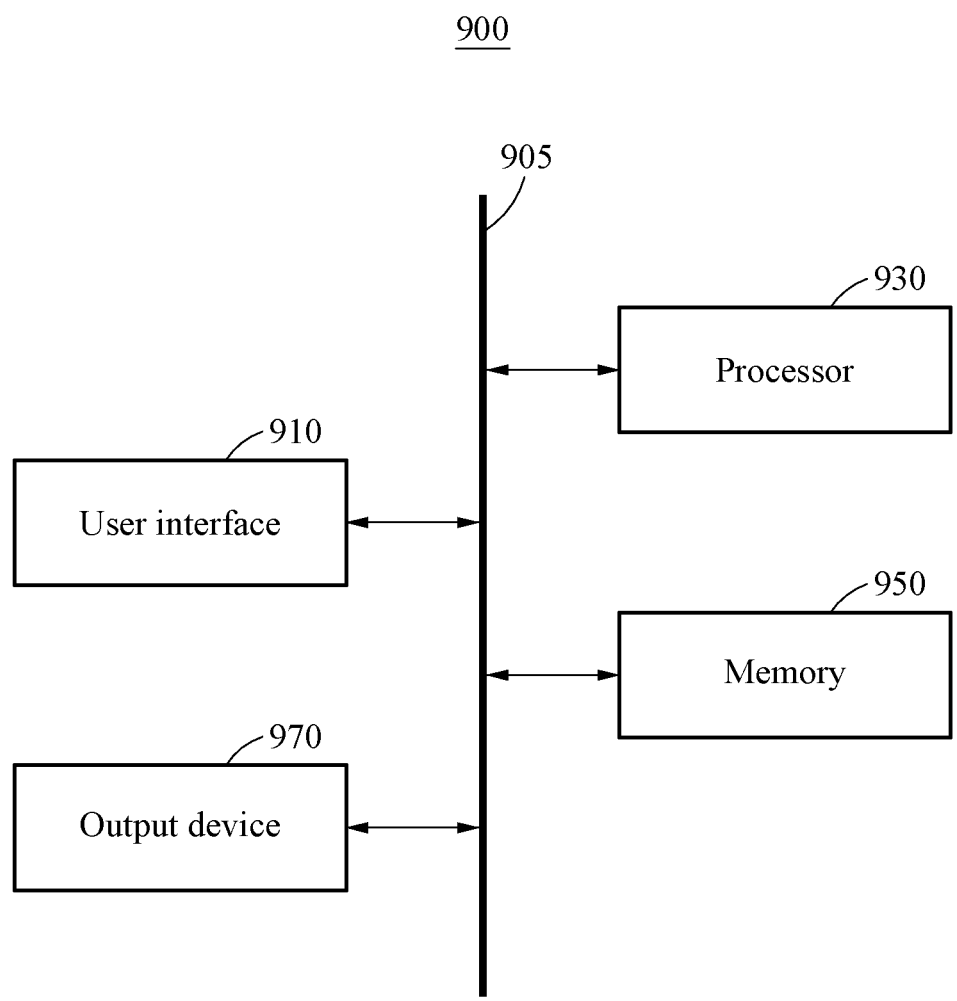
FIG. 9 is a block diagram of an apparatus displaying clothing patterns, according to an embodiment.

FIG. 9 is a block diagram of an apparatus displaying clothing patterns, according to an embodiment. Referring to FIG. 9, according to an embodiment, an apparatus (display apparatus') 900 displaying a clothing pattern includes a user interface 910 and a processor 930. The display apparatus 900 may further include a memory 950 and an output device 970. The user interface 910, the processor 930, the memory 950, and the output device 970 may communicate with one another through a communication bus 905.

The user interface 910 receives the locations of feature points extracted from the data of a 3D avatar. For example, the user interface 910 may include a touch input or the like through a stylus pen, a mouse, a keyboard, or a touch interface.

The processor 930 determines the attributes of the bounding volumes for each body part, to which the body type and orientation of the 3D avatar is reflected, based on the locations of the feature points received through the user interface 910. The processor 930 determines the initial locations of the clothing patterns by placing arrangement points on the bounding volumes depending on the attributes of the bounding volumes for each body part. The processor 930 drapes the clothing patterns to the 3D avatar depending on the initial locations.

For example, the memory 950 may store the data of the 3D avatar, the locations of the feature points received through the user interface 910, the attributes of the bounding volumes for each body part determined by the processor 930, the initial locations of the clothing patterns, the data of the 3D avatar on which the clothing patterns are draped, and the like. The memory 950 may be a volatile memory or a nonvolatile memory.

The output device 970 may output clothing patterns draped to the 3D avatar. The output device 970 may output clothing patterns draped to the 3D avatar on a screen, a clothing pattern making apparatus or the like. For example, the output device 970 may be a display or may be a communication interface communicating with the outside of the display apparatus 900.

In addition, the processor 930 may perform the at least one method described above with reference to FIGS. 1 to 8 or an algorithm corresponding to at least one method. The processor 930 may execute the program and may control the display apparatus 900. The program code executed by the processor 930 may be stored in the memory 950. For example, the processor 930 may be implemented with a Central Processing Unit (CPU), a Graphics Processing Unit (GPU), or a Neural network Processing Unit (NPU).

According to an aspect, to form bounding volumes matched with the size and shape of a 3D avatar, bounding volumes and arrangement points may be automatically generated by analyzing the shape of the 3D avatar without manually setting the location of the bounding volumes.

According to an aspect, the processing speed may be improved while the load of the processor is reduced, by simplifying the shape of the 3D avatar into the shape of a 2D shape to extract feature points.

According to an aspect, arrangement points may be automatically placed on the bounding volumes to determine the locations of the clothing patterns depending on the attributes of the bounding volumes for each body part, to which the body type and orientation of the 3D avatar are reflected; accordingly, clothing patterns may be placed on body parts quickly and accurately even without the arrangement process by a handwork.

The methods according to the above-described embodiment of the present invention may be implemented as program commands capable of being performed through various computer means and may be recorded in computer-readable media. The computer-readable medium may also include the program instructions, data files, data structures, or a combination thereof. The program instructions recorded in the media may be designed and configured specially for the exemplary embodiments of the present invention or be known and available to those skilled in computer software. The computer-readable medium may include a hardware system, which is specially configured to store and execute program instructions, such as magnetic media (e.g., a hard disk, a floppy disk, or a magnetic tape), optical recording media (e.g., CD-ROM and DVD), magneto-optical media (e.g., a floptical disk), read only memories (ROMs), random access memories (RAMs), and flash memories. Examples of computer instructions include not only machine language codes created by a compiler, but also high-level language codes that are capable of being executed by a computer by using an interpreter or the like. The described hardware devices may be configured to act as one or more software modules to perform the operations of the above-described exemplary embodiments of the present invention, or vice versa.

The methods according to the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Software may include computer programs, codes, instructions or one or more combinations thereof and configure a processing unit to operate in a desired manner or independently or collectively control the processing unit. The software and/or data may be permanently or temporarily embodied in any type of machine, components, a physical system, a virtual system (virtual equipment), computer storage media, or systems so as to be interpreted by the processing system or to provide instructions or data to the processing system. Software may be dispersed throughout computer systems connected via networks and be stored or executed in a dispersion manner. Software and data may be recorded in one or more computer-readable storage media.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of displaying clothing patterns, the method comprising:
   analyzing distribution of points on a two-dimensional (2D) shape generated by projecting a three-dimensional (3D) avatar onto a 2D plane in a specific direction;
   extracting feature points from the 2D shape based on the analysis result, each of the feature points representing a point on the 3D avatar that corresponds to a predetermined location of a body part of the 3D avatar;
   determining attributes of bounding volumes of the 3D avatar that are reflective of a body type and an orientation of the 3D avatar by processing locations of the extracted feature points, each of the bounding volumes corresponding to the body part of the 3D avatar;
   placing arrangement points on the bounding volumes by processing the attributes of the bounding volumes, each of the arrangement points representing a candidate location on the 3D avatar for initially placing clothing patterns; and selecting initial locations of the clothing patterns from the arrangement point, each of the initial locations representing a location where a predetermined point of each of the clothing pattern is initially placed.

2. The method of claim 1, wherein the determining of the attributes of the bounding volumes comprises:

forming the bounding volumes for each body part on at least one location of both hands, both feet, both elbows, both knees, both arms, both wrists, left/right torso, both shoulders, a head, a neck, both legs, left/right lower body, and both ankles of the 3D avatar.

3. The method of claim 1, wherein the bounding volumes correspond to both hands, both feet, both elbows, both knees, both arms, both wrists, left/right torso, both shoulders, a head, a neck, both legs, left/right lower body, and both ankles of the 3D avatar, respectively.

4. The method of claim 1, wherein at least one of the bounding volumes is defined as a solid column surrounding a corresponding body part, and wherein the attributes of the at least one of the bounding volumes include at least one of a cross-sectional shape of the solid column, a length of the solid column, a location of the solid column, and an orientation of the solid column.

5. The method of claim 1, wherein the specific direction includes at least one of a front view, a side view, or a top view.

6. The method of claim 1, wherein the extracting of the feature points from the 2D shape includes:

extracting first feature points corresponding to at least one of both arms, both wrists, a left/right torso, both shoulders, a head, a neck, both legs, a left/right lower body, both ankles, armpits, a groin, fingertips of both fingers, between fingers, both backs of hands, both elbows, both knees, both backs of feet, ends of both toes, and both heels of the 3D avatar, from a 2D shape derived from a front view of the 3D avatar;

extracting second feature points corresponding to at least one of the head, the neck, hips, a belly, a chest, fingertips of both hands, between fingers of both hands, heels of both feet, and ends of both toes of the 3D avatar, from the 2D shape derived from a side view of the 3D avatar; and extracting the feature points corresponding to a pelvis of the 3D avatar from a point that protrudes furthest from both sides on a plane connecting feature points corresponding to the hip and the belly by rotating the 2D shape in the side view direction to a front view.

7. The method of claim 1, wherein the extracting of the feature points from the data of the 3D avatar includes:

detecting a deformation of the 3D avatar; and re-extracting another set of feature points from the deformed data of the 3D avatar in response to the deformation of the 3D avatar.

8. The method of claim 1, wherein the feature points correspond to at least one of both arms, both wrists, a left/right torso, both shoulders, a head, a neck, both legs, a left/right lower body, both ankles, armpits, a groin, a pelvis, hips, a belly, a chest, both hands, both feet, both elbows, both knees, both fingertips, between fingers, both backs of hands, both backs of feet, both ends of toes, and both heels of the 3D avatar.

9. The method of claim 1, wherein the 3D avatar is created (i) based on a predetermined body size, (ii) a size obtained by changing the predetermined body size, (iii) created by a user, (iv) created based on data obtained by three-dimensional scanning of a body of the user, or (v) created based on pieces of 2D image data obtained by capturing a plurality of images at various angles.

10. The method of claim 1, further comprising:

draping the clothing patterns onto the 3D avatar by placing the clothing patterns on the initial locations.

11. The method of claim 10, wherein the clothing patterns include information corresponding to the bounding volumes and the arrangement points.

12. A non-transitory computer readable storage medium storing instructions thereon, the instructions when executed by a processor cause the processor to:

analyze distribution of points on a two-dimensional (2D) shape generated by projecting a three-dimensional (3D) avatar onto a 2D plane in a specific direction;

extract feature points from the 2D shape based on the analysis result, each of the feature points representing a point on the 3D avatar that corresponds to a predetermined location of a body part of the 3D avatar;

determine attributes of bounding volumes of the 3D avatar that are reflective of a body type and an orientation of the 3D avatar by processing locations of the extracted feature points, each of the bounding volumes corresponding to a body part of the 3D avatar;

place arrangement points on the bounding volumes by processing the attributes of the bounding volumes, each of the arrangement points representing a candidate location on the 3D avatar for initially placing clothing patterns; and select initial locations of clothing patterns for draping from the arrangement points, each of the initial locations representing a location where a predetermined point of each of the clothing pattern is initially placed.

13. An apparatus of displaying clothing patterns, comprising:

a user interface to receive locations of feature points extracted from data of a 3D avatar;

a processor; and a memory storing instructions thereon, the instructions when executed by the processor cause the processor to:

analyze distribution of points on a two-dimensional (2D) shape generated by projecting a three-dimensional (3D) avatar onto a 2D plane in a specific direction, extract feature points from the 2D shape based on the analysis result, each of the feature points representing a point on the 3D avatar that corresponds to a predetermined location of a body part of the 3D avatar, determine attributes of bounding volumes of the 3D avatar that are reflective of a body type and an orientation of the 3D avatar by processing locations of the extracted feature points, each of the bounding volumes corresponding to the body part of the 3D avatar, place arrangement points on the bounding volumes by processing the attributes of the bounding volumes, each of the arrangement points representing a candidate location on the 3D avatar for initially placing clothing patterns; and select initial locations of the clothing patterns from the arrangement point, each of the initial locations representing a location where a predetermined point of each of the clothing pattern is initially placed.

\* \* \* \* \*